US010150217B2

(12) United States Patent
Kato (10) Patent No.: US 10,150,217 B2
(45) Date of Patent: Dec. 11, 2018

(54) TOOL ADAPTER FOR ROBOT WRIST AND ROBOT WITH TOOL ADAPTER ATTACHED THERETO

(71) Applicant: FANUC CORPORATION, Minamitsuru-gun, Yamanashi (JP)

(72) Inventor: Yoshiaki Kato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 257 days.

(21) Appl. No.: 14/964,015

(22) Filed: Dec. 9, 2015

(65) Prior Publication Data
US 2016/0167236 A1    Jun. 16, 2016

(30) Foreign Application Priority Data
Dec. 10, 2014    (JP) .................. 2014-250265

(51) Int. Cl.
*B25J 15/04* (2006.01)
*B25J 15/00* (2006.01)

(52) U.S. Cl.
CPC ....... *B25J 15/0408* (2013.01); *B25J 15/0019* (2013.01)

(58) Field of Classification Search
CPC ... B23K 9/287; B25J 15/0019; B25J 15/0408; B25J 17/0258; B25J 17/0275; B25J 17/0283; B25J 17/0291; Y10S 901/29; Y10S 901/42; Y10T 74/20335
USPC ..................... 414/735; 901/29, 42
See application file for complete search history.

(56) References Cited

U.S. PATENT DOCUMENTS

| 4,552,502 A * | 11/1985 | Harjar | B25J 9/0081 |
| | | | 414/680 |
| 5,655,426 A * | 8/1997 | DeJohn | B23Q 1/5468 |
| | | | 83/177 |
| 2011/0252921 A1 * | 10/2011 | Nakagiri | B25J 9/104 |
| | | | 74/665 R |
| 2012/0067354 A1 | 3/2012 | Lammertse | |
| 2014/0137691 A1 * | 5/2014 | Nogami | B25J 17/02 |
| | | | 74/490.06 |

FOREIGN PATENT DOCUMENTS

| EP | 0090942 A2 * | 10/1983 | ............. B23K 9/287 |
| EP | 0178944 A1 * | 4/1986 | ........... B23B 39/205 |
| JP | S60180794 A | 9/1985 | |

(Continued)

*Primary Examiner* — Saul Rodriguez
*Assistant Examiner* — Brendan P Tighe
(74) *Attorney, Agent, or Firm* — RatnerPrestia (57) ABSTRACT

A tool adapter configured to mount a tool on a robot wrist including a first rotary member rotatable about a first axis and a second rotary member rotatable about a second axis orthogonal to the first axis. The tool adapter includes a first section configured to be attached to the second rotary member at a first attaching portion; and a second section extending from the first section and configured to be attached to the tool at a second attaching portion. The first attaching portion and the second attaching portion are respectively disposed at positions where a direction of a reaction force applied to the second section through the tool from an object, during an operation performed to the object with use of the tool, is defined to intersect with both of the first axis and the second axis.

4 Claims, 6 Drawing Sheets

(56) References Cited

FOREIGN PATENT DOCUMENTS

| | | |
|---|---|---|
| JP | 63260775 | 10/1988 |
| JP | H 07-001276 A | 1/1995 |
| JP | 0999377 | 4/1997 |

* cited by examiner

TOOL ADAPTER FOR ROBOT WRIST AND ROBOT WITH TOOL ADAPTER ATTACHED THERETO

BACKGROUND OF THE INVENTION

1. Field of the Invention

The present invention relates to a tool adapter for mounting a tool on a robot wrist. The present invention also relates to a robot with a tool adapter attached to a wrist.

2. Description of the Related Art

Generally, the wrist of an industrial robot (in this specification, simply called a robot) has two or three degrees of freedom. In certain cases, when mounting the wrist with a tool (i.e., an end effector), such as a stud welding gun or a boring head, that receives a relatively large reaction force from an object being worked on, the direction of the reaction force expected to be applied to the wrist through the tool from the object has to be taken into account. For example, a tool supporting device disclosed in Japanese Unexamined Patent Publication No. H07-001276 (JPH07-001276A) is configured to mount a tool to an arm end of a multi-axis robot in a swingable manner and in a gravitationally balanced condition, and includes a pressing device for pressing the mounted tool onto the workpiece. Referring to the drawing, it will be understood that the "end of a robot arm Ra" is connected to the "robot arm Ra" so as to be rotatable about a first axis (the axis perpendicular to the plane of the page) and that a "support bracket 10 attached to the end of the robot arm Ra" is connected to the "end of the robot arm Ra" so as to be rotatable about a second axis orthogonal to the first axis. Further, referring to the drawing, it will also be understood that the vector of the reaction force applied to the tool from the workpiece being worked on is located in a position that is displaced substantially parallel from the second axis contained in the "support bracket 10" and that does not intersect the first axis contained in the "end of the robot arm Ra".

In the above-described configuration disclosed in JPH07-001276A, a moment of force about the first axis occurs at the "end of the robot arm Ra", i.e., the wrist, because of the reaction force applied to the tool from the workpiece being worked. If the wrist is deflected due to the moment of force, the quality of the robot operation being performed using the toll may be affected. If, in this case, the position of the vector of the reaction force applied to the tool from the workpiece being worked on is made to coincide with the second axis of the "support bracket 10", the occurrence of the moment of force can be avoided. This configuration, however, can increase the distance from the first axis of the "end of the robot arm Ra" to the tool end, tending to cause interference with the workpiece and its peripheral objects, and hence a concern that the workability of the operation may degrade.

SUMMARY OF THE INVENTION

In a tool adapter for mounting a tool on a wrist of a robot, it is desired to eliminate influence of a reaction force on the quality of a robot operation, the reaction force applied from an object to the wrist through the tool, without degrading the workability of the robot operation performed by using the tool.

One aspect of the present invention provides a tool adapter configured to mount a tool on a robot wrist, the robot wrist having two or more degrees of freedom and including a first rotary member rotatable about a first axis and a second rotary member rotatable about a second axis orthogonal to the first axis, the tool adapter comprising a first section provided with a first attaching portion and configured to be attached to the second rotary member at the first attaching portion; and a second section extending from the first section, the second section provided with a second attaching portion and configured to be attached to the tool at the second attaching portion; wherein the first attaching portion and the second attaching portion are respectively disposed at positions where a direction of a reaction force applied to the second section through the tool from an object, during an operation performed to the object with use of the tool, is defined to intersect with both of the first axis and the second axis.

Another aspect of the present invention provides a robot comprising a wrist having two or more degrees of freedom, wherein the above tool adapter is attached to the wrist.

In the tool adapter according to one aspect, since the vector of the reaction force applied through the tool to the second section of the tool adapter during the robot operation is located at a position that intersects the first axis, a moment of force about the first axis is prevented from occurring at the wrist. Accordingly, the components of the wrist, including the first rotary member and the second rotary member, are free from deflection that may be caused by the reaction force. If no deflection occurs in the components of the wrist, influence of the reaction force on the quality of the operation can be eliminated. Further, since the first attaching portion and the second attaching portion are respectively disposed at positions where the direction of the reaction force is defined to intersect with the second axis, the second rotary member having the second axis can be disposed at a position away from the tool at a predetermined angle about the first axis. As a result, possible interference between the wrist and the object or other peripheral objects can be avoided. Since the tool is attached to the second section, the distance between the first axis and the end of the tool is reduced, and the interference between the wrist and the object or other peripheral objects is thus avoided. Thus, according to the tool adapter, influence of the reaction force, applied from the object to the wrist through the tool, on the quality of the robot operation can be eliminated without degrading the workability of the robot operation performed by using the tool.

According to the robot of the other aspect, the quality of the robot operation can be improved without degrading the workability of the robot operation performed by using the tool.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Embodiments of the present invention will be described below with reference to the accompanying drawings. Throughout the drawings, corresponding components are designated by like reference numerals.

Figure 1:
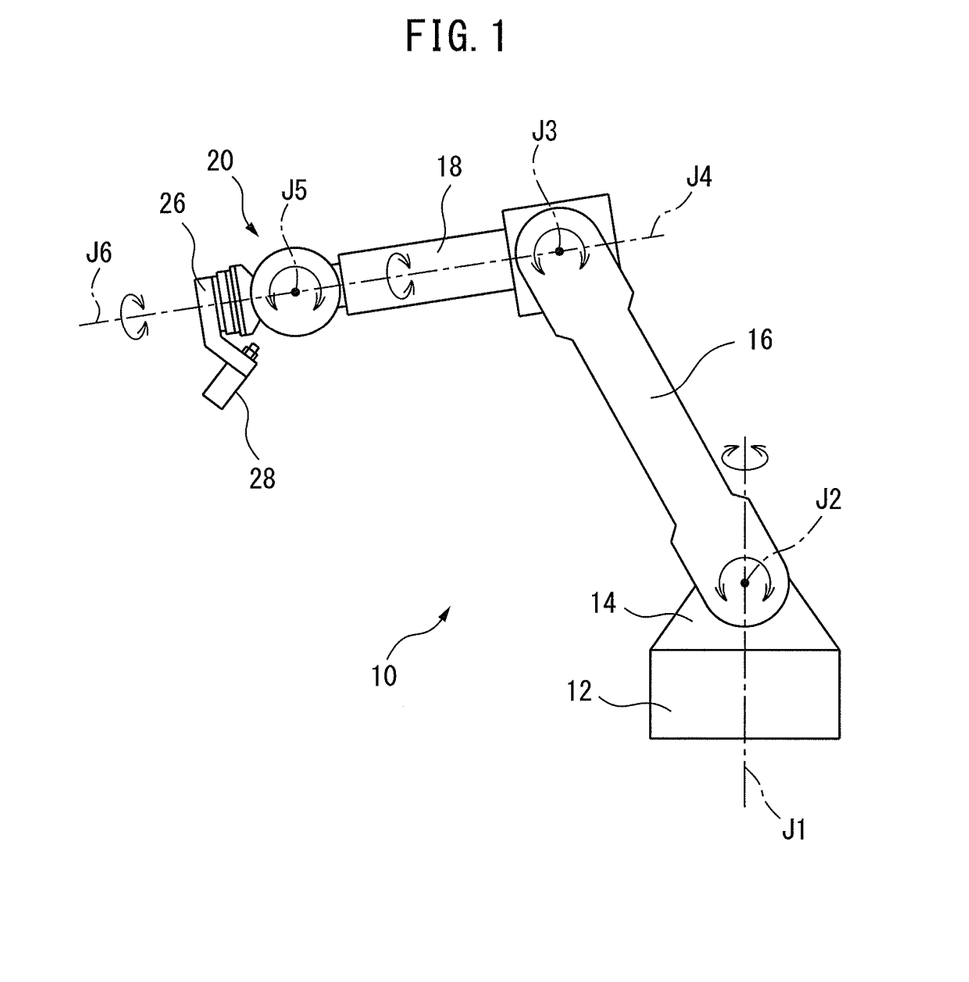
FIG. 1 is a front view showing in schematic form a robot according to one embodiment.

FIG. 1 shows a robot 10 according to one embodiment. The robot 10 includes a stationary base 12, a swivel base 14 connected to the stationary base 12 so as to be rotatable (or to swivel) about a vertical axis line J1 (hereinafter referred to as an axis J1), a lower arm 16 connected to the swivel base 14 so as to be rotatable (or to swing) about a horizontal axis line J2 (hereinafter referred to as an axis J2) orthogonal to the axis J1, an upper arm 18 connected to the lower arm 16 so as to be rotatable (or to swing) about a horizontal axis line J3 (hereinafter referred to as an axis J3) parallel to the axis J2, and a wrist (or a robot wrist) 20 connected to the upper arm 18 so as to be rotatable (or to turn) about an axis line J4 (hereinafter referred to as an axis J4) orthogonal to the axis J3.

Figure 2:
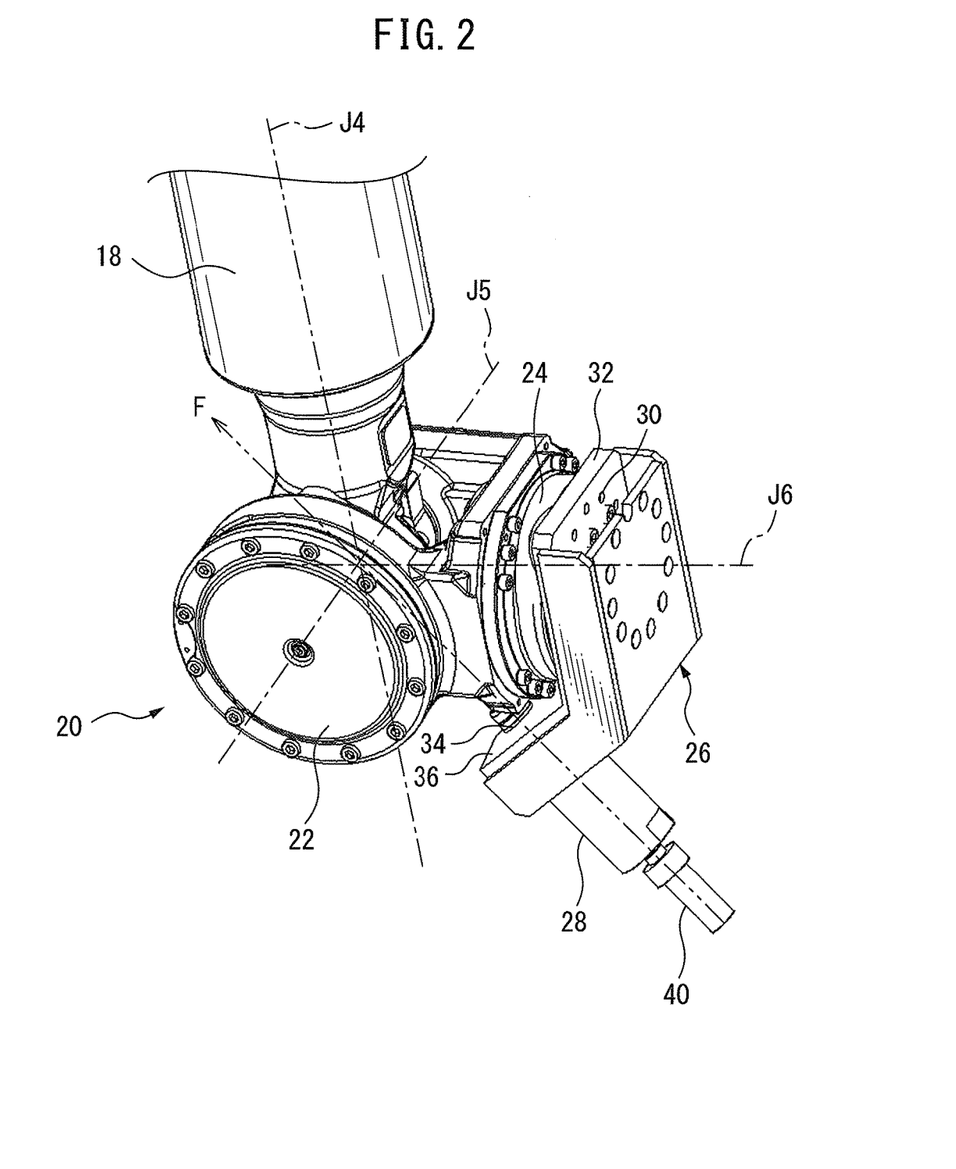
FIG. 2 is an enlarged perspective view of a wrist of the robot shown in FIG. 1.

As shown in enlarged form in FIG. 2, the wrist 20 includes a first rotary member 22 connected to the upper arm 18 so as to be rotatable (or to bend) about a first axis line J5 (hereinafter referred to as a first axis J5) orthogonal to the axis J4, and a second rotary member 24 connected to the first rotary member 22 so as to be rotatable (or to turn) about a second axis line J6 (hereinafter referred to as a second axis J6) orthogonal to the first axis J5. The axes J4, J5 and J6 are arranged so as to intersect with each other at a single point. A tool adapter 26 according to one embodiment is attached to the second rotary member 24, and a tool 28 is supported on the tool adapter 26.

The robot 10 according to this embodiment includes a vertical articulated manipulator having an arm structure with three degrees of freedom (J1 to J3) and a wrist structure with three degrees of freedom (J4 to J6) as described above. By controlling the respective axes J1 to J6 in various ways and thereby operating the lower arm 16, the upper arm 18 and the wrist 20 in various different ways, the robot 10 can accomplish various tasks using the tool 28. In the present invention, the configuration of the axes of the robot 10 is not limited to the above specific configuration. For example, the robot 10 may include a vertical articulated manipulator having five or less axes or seven or more axes, or may include a manipulator of any of various known mechanical configurations such as a horizontal articulated type or a rectangular coordinate type. Further, the wrist 20 may be configured to have only two degrees of freedom by omitting, for example, the axis J4.

Figure 3A:
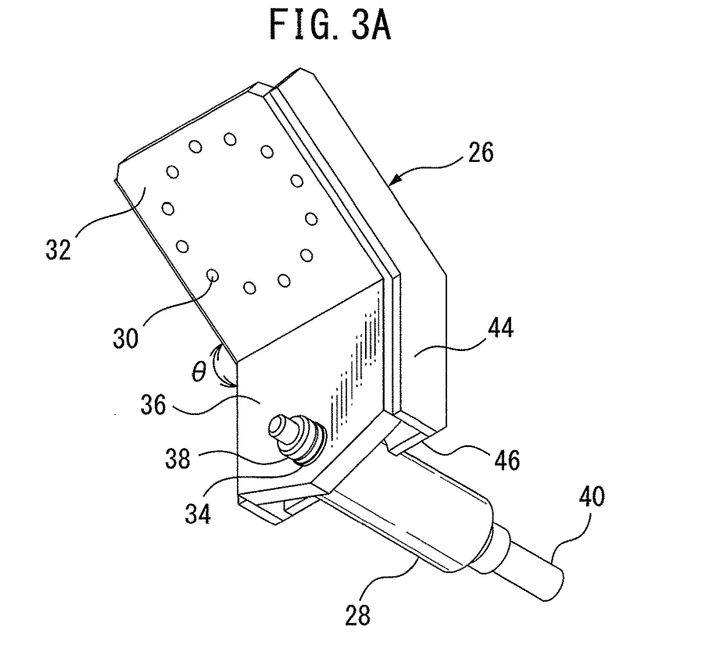
FIG. 3A is a perspective view of a tool adapter according to one embodiment as viewed from one direction.

The tool adapter 26 according to one embodiment is a member for mounting the tool 28 on the wrist 20 including the first and second rotary members 22 and 24 and having two or more degrees of freedom. As shown in FIG. 3A, the tool adapter 26 includes a first section 32 provided with a first attaching portion 30, and a second section 36 extending from the first section 32 and provided with a second attaching portion 34. The first section 32 is configured to be attached to the second rotary member 24 at the first attaching portion 30 as shown in FIG. 2, and fixed to the second rotary member 24 by fastening means such as a not-shown nut and bolt. The second section 36 is configured to be attached to the tool 28 at the second attaching portion 34, and fixed to the tool 28 by fastening means 38 such as a nut and bolt. In this embodiment, the first attaching portion 30 is provided with a plurality of through holes into which bolts are respectively inserted, and the second attaching portion 34 is provided with a single hole into which a bolt is inserted.

As shown in FIG. 3A, each of the first section 32 and the second section 36 has a flat plate-like shape. In this embodiment, the first and second sections 32 and 36 are formed integrally with each other. The flat plate-like first section 32 including the first attaching portion 30 and the flat plate-like second section 36 including the second attaching portion 34 are disposed so as to make a non-zero angle θ with respect to each other. Further, as shown in FIG. 2, the first attaching portion 30 and the second attaching portion 34 are respectively disposed at positions where the direction of a reaction force F applied to the second section 36 through the tool 28 from an object, during the robot operation performed with use of the tool 28, is defined to intersect with both of the first axis J5 and the second axis J6.

Examples of the robot operation performed with use of the tool 28 mounted on the wrist 20 via the tool adapter 26 will be described below with reference to FIGS. 4 and 5. In the illustrated examples, the tool 28 is a stud welding gun, and a stud 40 is attached to the tool 28 as shown. In the present invention, the tool 28 is not limited to any specific type, but any of various known types of tool 28 can be mounted on the wrist 20. When the tool 28 is a tool, such as a stud welding gun or a boring head, that receives a relatively large reaction force from an object being worked on, the effect of the present invention is enormous and extremely advantageous.

Figure 4:
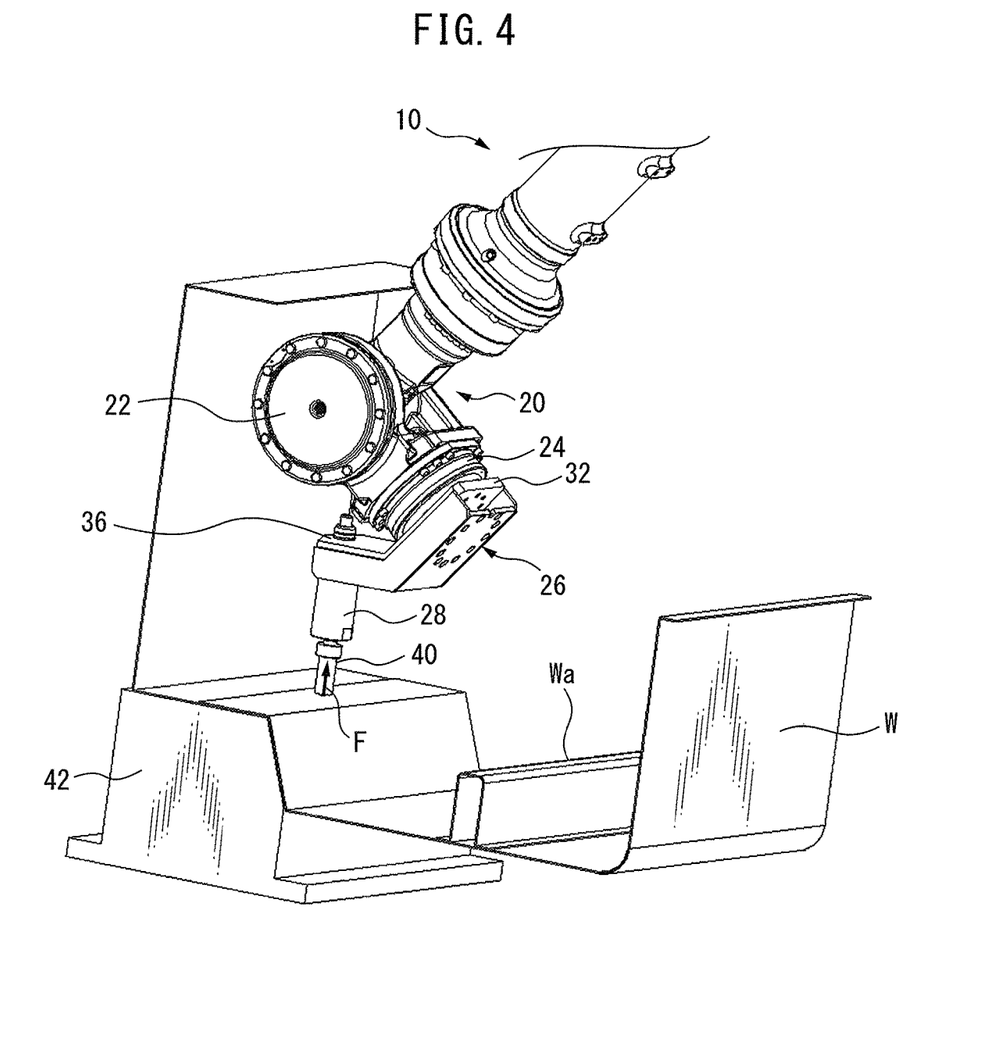
FIG. 4 is a perspective view showing one example of robot operation performed with use of a tool mounted on the wrist via the tool adapter of FIG. 3A.

In the example of the operation shown in FIG. 4, the robot 10 welds the stud 40 to the workpiece W, i.e. the object, by using the tool 28 mounted on the wrist 20 via the tool adapter 26. The workpiece W is supported on a support base 42. Since the stud 40 is pressed onto the workpiece W with a predetermined pressing force during the welding, the reaction force F of the pressing force is applied to the second section 36 of the tool adapter 26 through the stud 40 and the tool 28. At this time, since the vector of the reaction force F is located at a position that intersects the first axis J5 as shown in FIG. 2, a moment of force about the first axis J5 is prevented from occurring at the wrist 20. Accordingly, the components of the wrist 20, including the first and second rotary members 22 and 24, are free from deflection that may be caused by the reaction force F. If no deflection occurs in the components of the wrist 20, influence of the reaction force F on the quality of the operation (i.e., the stud welding), such as the slip of the stud 40 on the workpiece W, can be eliminated.

Figure 5:
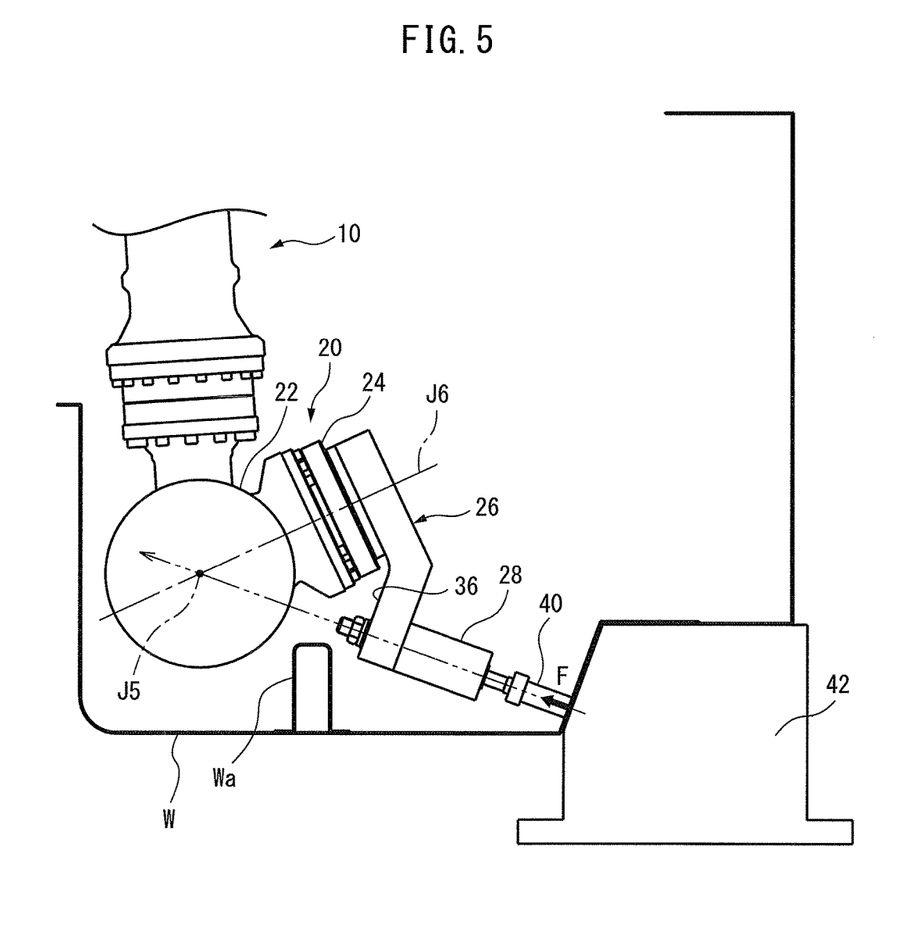
FIG. 5 is a perspective view showing another example of robot operation performed with use of the tool mounted on the wrist via the tool adapter of FIG. 3A.

When performing a robot operation similar to that shown in FIG. 4 on another portion of the workpiece W supported on the workpiece W as shown in FIG. 5, the wrist 20 may interfere with the workpiece W or other peripheral objects. In the example of FIG. 5, the wrist 20 may hit a protruding portion Wa of the workpiece W. In this situation, since the first and second attaching portions 30 and 34 of the tool adapter 26 are respectively disposed at positions where the direction of the reaction force F is defined to intersect with the second axis J6, as shown in FIG. 2, the second rotary member 24 having the second axis J6 can be disposed at a position a predetermined angle away from the tool 28 around the first axis J5. As a result of such an arrangement, a space is created between the first rotary member 22 of the wrist 20 and the second section 36 of the tool adapter 26, and this space serves to avoid possible interference between the wrist 20 and the protruding portion Wa of the workpiece W. If the tool 28 were attached to the first section 32 of the tool adapter 26 so that the position of the vector of the force F would coincide with the second axis J6, the distance between the first axis J5 and the end of the stud 40 would increase, and in this case also, interference between the wrist 20 and the workpiece W could occur. By contrast, since the tool 28 is attached to the second section 36 of the tool adapter 26, the distance between the first axis J5 and the end of the stud 40 is reduced, and the interference between the wrist 20 and the workpiece W is thus avoided.

In this way, according to the tool adapter 26, influence of the reaction force F, applied from the workpiece W to the wrist 20 through the tool 28, on the quality of the robot operation can be eliminated, without degrading the workability of the robot operation performed by using the tool 28. Further, according to the robot 10 with the tool adapter 26 attached to the wrist 20, the quality of the robot operation can be improved without degrading the workability of the robot operation performed by using the tool 28.

Figure 3B:
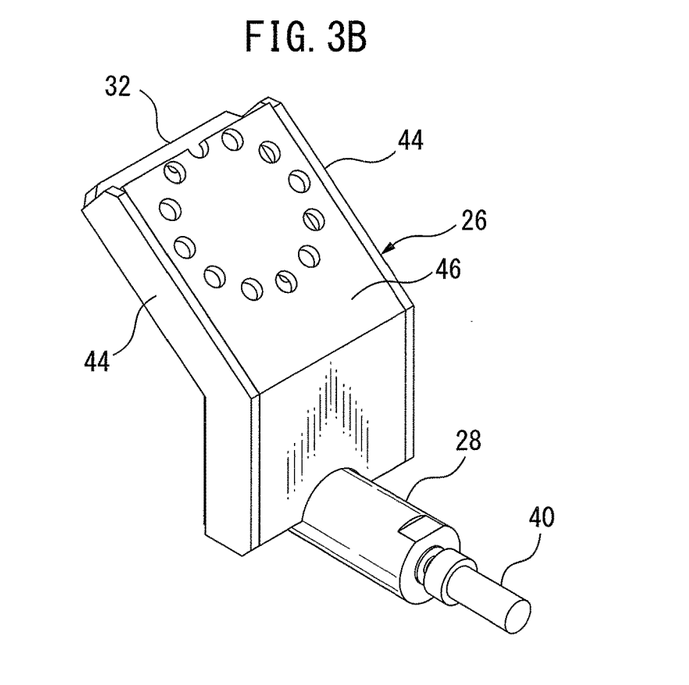
FIG. 3B is a perspective view of the tool adapter according to the one embodiment as viewed from another direction.

As shown in FIG. 3B, the tool adapter 26 includes a pair of side walls 44 provided along the pair of side edges of the flat plate-like first and second sections 32 and 36, and a top wall 46 extending so as to bridge between the two side walls 44 and spaced apart from the first and second sections 32 and 36 in substantially parallel relationship thereto. The side walls 44 and the top wall 46 together serve to increase the overall rigidity of the tool adapter 26, including the flat plate-like first and second sections 32 and 36, against external forces (especially, the reaction force F). The increased rigidity of the tool adapter 26 prevents the tool adapter 26 from being deflected due to the reaction force F, for example, during the robot operation shown in FIGS. 4 and 5, and eliminates the cause that can affect the quality of the robot operation.

Figure 6:
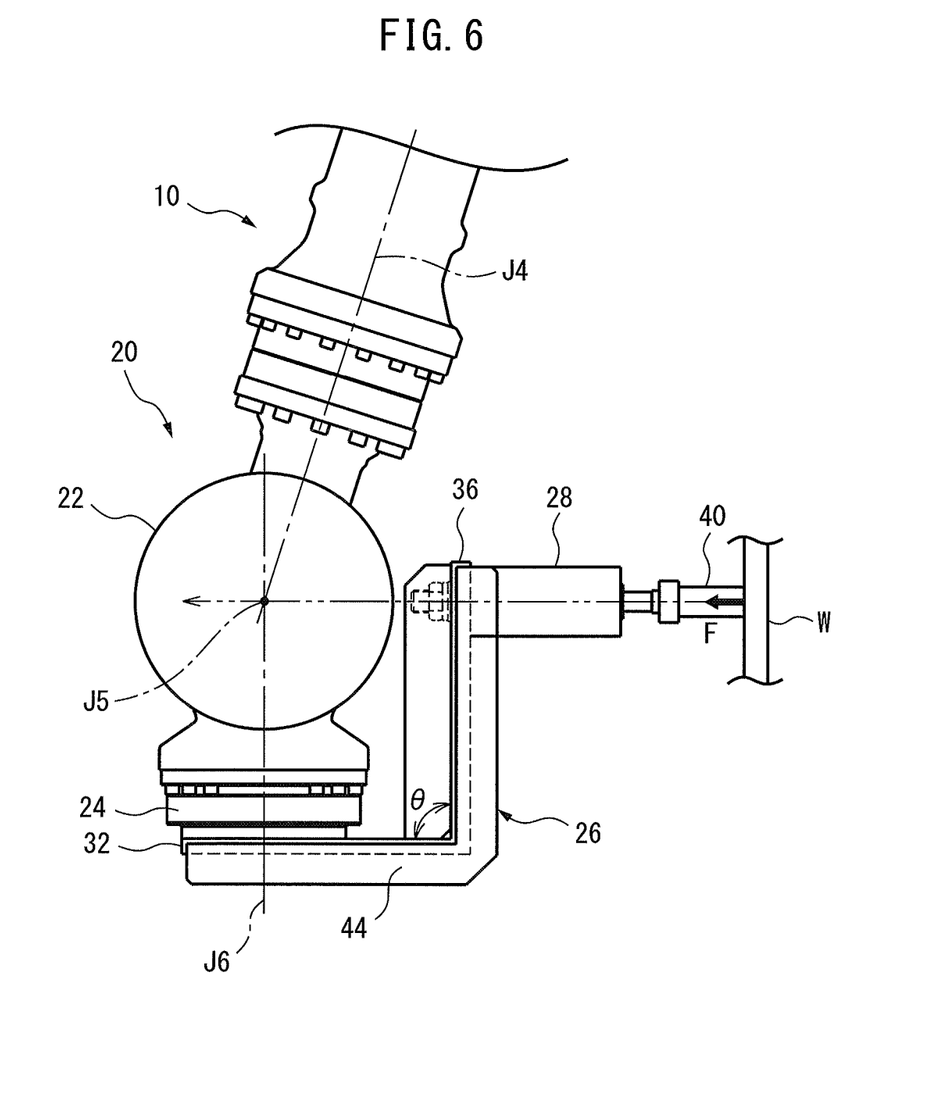
FIG. 6 is a front view showing the wrist to which a tool adapter according to another embodiment is attached.

The tool adapter 26 can have various configurations other than that shown here. The first and second sections 32 and 36 can be configured to have a polygonal or an oval-shaped contour instead of the substantially rectangular contour shown here. It is also possible to omit the side walls 44 and the top wall 46 by increasing the thickness of the first and second sections 32 and 36. The first and second sections 32 and 36 may be formed as separate components and may be fixedly connected together. The angle θ that the first section 32 makes with the second section 36 may be set to about 90° as shown in FIG. 6. The configuration of the tool adapter 26 can be modified in various ways according to the configuration of the robot 10 and arm 20 with which the tool adapter 26 is used, the type of the robot operation, the shape of the object (or workpiece W), the required rigidity, etc.

While the invention has been described with reference to specific embodiments, it will be understood, by those skilled in the art, that various changes or modifications may be made thereto without departing from the scope of the following claims.

The invention claimed is:

1. A tool adapter configured to mount a tool on a robot wrist, the robot wrist having two or more degrees of freedom and including a first rotary member rotatable about a first axis and a second rotary member rotatable about a second axis orthogonal to the first axis, the tool adapter comprising:
   a flat plate-like first section provided with a first attaching portion and configured to be attached to the second rotary member at the first attaching portion;
   a flat plate-like second section extending from the first section, the second section provided with a second attaching portion and configured to be attached to the tool at the second attaching portion;
   a pair of side walls provided along a pair of side edges of the first and second sections; and
   a top wall extending so as to bridge between the pair of side walls, the top wall spaced apart from and in parallel to the first and second sections, the top wall including a cutout portion aligned with the second attaching portion of the flat plate-like second section, the cutout portion for the tool to pass through to attach to the second attaching portion of the flat plate-like second section, and
   wherein the first attaching portion and the second attaching portion are respectively disposed at positions where a direction of a reaction force applied to the second section through the tool from an object, during an operation performed to the object with use of the tool, is defined to intersect with both of the first axis and the second axis.

2. The tool adapter of claim 1, wherein the first section and the second section define a non-zero angle relative to each other.

3. The tool adapter of claim 1, wherein the tool is a stud welding gun or a boring head.

4. A robot comprising a wrist having two or more degrees of freedom, wherein the tool adapter of claim 1 is attached to the wrist.

* * * * *